US012724162B2

(12) United States Patent
Aldawood et al.

(10) Patent No.: US 12,724,162 B2
(45) Date of Patent: Sep. 1, 2026

(54) DRILL BIT SOURCE FOCUSING

(71) Applicant: Saudi Arabian Oil Company, Dhahran (SA)

(72) Inventors: Ali Aldawood, Safwa (SA); Ali Al Zayer, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 374 days.

(21) Appl. No.: 18/587,380

(22) Filed: Feb. 26, 2024

(65) Prior Publication Data

US 2025/0271585 A1 Aug. 28, 2025

(51) Int. Cl.
*G01V 1/30* (2006.01)
*G01V 1/36* (2006.01)

(52) U.S. Cl.
CPC .............. *G01V 1/302* (2013.01); *G01V 1/362* (2013.01); *G01V 1/366* (2013.01); *G01V 2210/1216* (2013.01); *G01V 2210/1425* (2013.01)

(58) Field of Classification Search
CPC ........ G01V 1/302; G01V 1/362; G01V 1/366; G01V 2210/1216; G01V 2210/1425
See application file for complete search history.

(56) References Cited

U.S. PATENT DOCUMENTS 9,128,205 B2 9/2015 Guan et al.
9,477,001 B2 * 10/2016 van Groenestijn ...... G01V 1/36
11,346,972 B2 5/2022 Al-Ali et al.
2012/0327742 A1 * 12/2012 Kusko .................... G01V 1/137 367/25
2025/0271585 A1 * 8/2025 Aldawood ............. G01V 1/302

FOREIGN PATENT DOCUMENTS

GB 2610201 A * 3/2023 ............ G01V 1/362
WO WO-2021137704 A1 * 7/2021 ............ G01V 1/362

OTHER PUBLICATIONS

Artman et al., “Source location using time-reverse imaging,” Geophysical Prospecting, Jun. 2010, 58:861-873, 13 pages.
Bakulin et al., “Application of supergrouping to enhance 3D prestack seismic data from a desert environment,” The Leading Edge, Mar. 2018, 37(3):200-207, 8 pages.

(Continued)

*Primary Examiner* — Daniel Pihulic
(74) *Attorney, Agent, or Firm* — Fish & Richardson P.C.

(57) ABSTRACT

A computer implemented method that enables drill bit source focusing is described. The method includes obtaining, using at least one hardware processor, correlated drill bit gathers comprising a direct arrival from a downhole source to surface receivers; identifying, using the at least one hardware processor, at least one window around first breaks in the correlated drill bit gathers captured by the surface receivers, wherein the first breaks are isolated/bounded the at least one window; redatuming, using the at least one hardware processor, seismic data within the at least one window captured by respective surface receivers to generate source images; and generating, using the at least one hardware processor, a seismic migration image by multiplying the generated source images.

15 Claims, 7 Drawing Sheets

(56) References Cited

OTHER PUBLICATIONS

Bakulin et al., "Seismic-while-drilling applications from the first DrillCAM trial with wireless geophones and instrumented top drive," The Leading Edge, Jun. 2020, 39(6):422-429, 8 pages.
Fink, "Time-reversal acoustics in complex environments," Geophysics, Aug. 2006, 71(4):SI151-SI164, 14 pages.
Haldorsen et al., "Walk-away VSP using drill noise as a source," Geophysics, Jul. 1995, 60(4):978-997, 20 pages.
Liu et al., "Sparsity-promoting least-squares interferometric migration for high-resolution passive source location," Geophysics, Jan. 2021, 86(1):KS1-KS9, 9 pages.
Schuster et al., "Interferometric/daylight seismic imaging," Geophysical Journal International, 2004, 157:838-852, 15 pages.
Thurber et al., "Advances in global seismic event location. in Advances in seismic event location," Springer, 2000, 271 pages.
Zhang et al., "Double-difference tomography: The method and its application to the Hayward Fault, California," Bulletin of the Seismological Society of America, Oct. 2003, 93:1875-1889, 15 pages.
Zhu et al., "Hybrid multiplicative time-reversal imaging reveals the evolution of microseismic events: Theory and field-data tests," Geophysics, Jun. 2019, 84(3):KS71-KS83, 13 pages.

* cited by examiner

DRILL BIT SOURCE FOCUSING

TECHNICAL FIELD

This disclosure relates generally to drill bit source focusing.

BACKGROUND

Seismic sources are located for use in a wide range of geophysical applications such as earthquake location, passive seismic monitoring, and drill bit imaging. Traditionally, techniques to determine the location of a seismic source yields noisy, low-resolution subsurface images of the seismic source.

DETAILED DESCRIPTION

Drill bit source focusing is described. The present techniques include utilizing seismic-while-drilling data along with a waveform-based migration to produce a seismic image of the while-drilling drill bit source. In examples, seismic while-drilling-data is processed to obtain correlated seismic-while-drilling signal using a pilot trace. In examples, a first break is isolated using a velocity profile and a bounding window is identified around the first break. In examples, a migration algorithm is applied to the windowed early arrivals to produce the seismic migrated image of the while-drilling drill bit source. In embodiments, the migration algorithm includes a multiplicative imaging condition that promotes sparsity. The multiplicative imaging condition combines the output of migrated seismic images through multiplication to enhance coherent events and eliminate random noise.

Some advantages of the present techniques include enabling for the high-resolution imaging of the drill bit from collected seismic-while-drilling data. Traditional imaging workflows utilize a summation imaging condition that yields a low resolution depiction of the true drill bit source locations with high uncertainty. The deficiency of traditional imaging workflows of drill bits is that they are either travel time-based requiring exhaustive and accurate picking of direct arrivals on noisy drill bit seismic datasets or they are limited to summation imaging conditions that yield poorly resolved drill bit locations. The present techniques utilize a waveform-based inversion of the drill bit source imaging with multiplicative imaging conditions. The multiplicative imaging conditions promote sparseness of the drill bit image and is robust in view of the underlying noisy first-arriving waveforms of seismic-while-drilling data.

Figure 1:
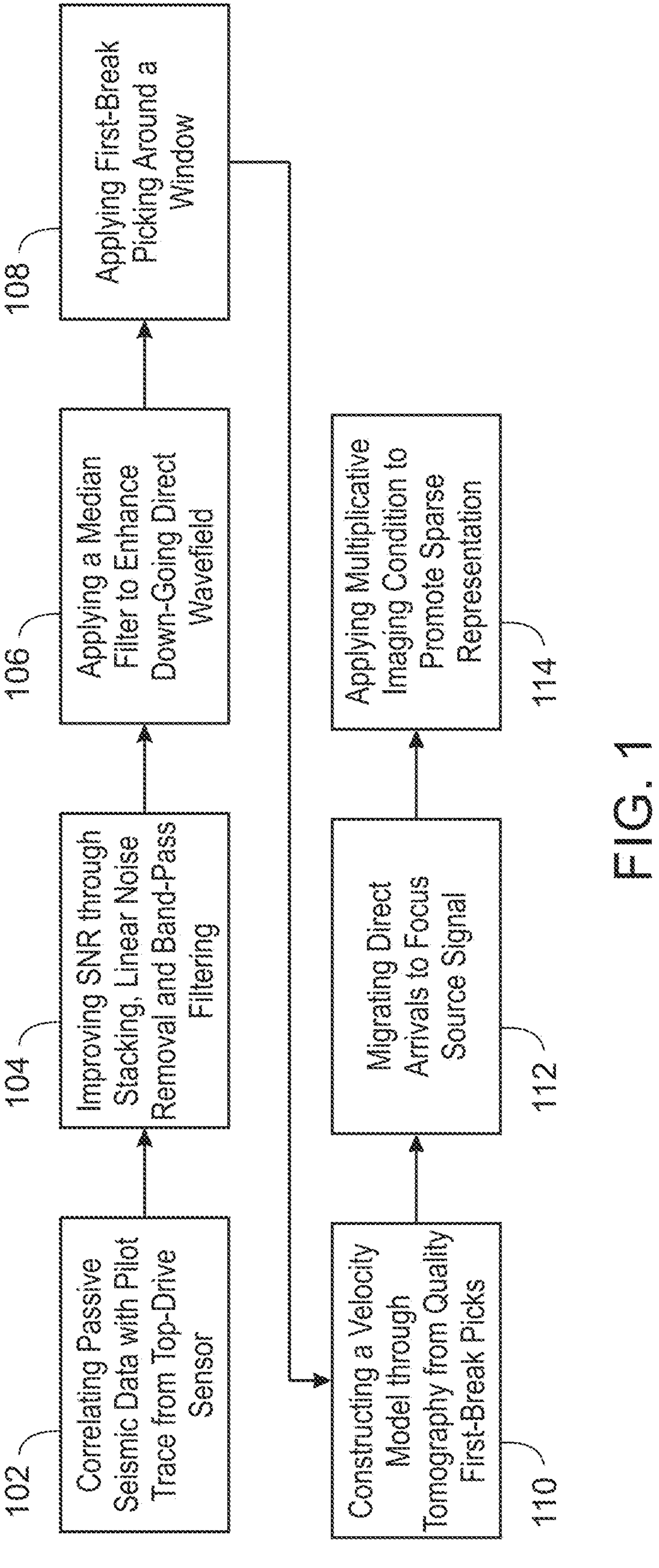
FIG. 1 shows a workflow that enables drill bit source focusing.

FIG. 1 shows a workflow that enables drill bit source focusing. The workflow is a processing workflow to produce a seismic migrated image of the while-drilling d rill bit source as it traverses through the earth layers from the surface to a total depth. In examples, the total depth is a predetermined depth below the Earth's surface.

Locating seismic sources is used in a wide range of geophysical applications such as earthquake location, passive seismic monitoring, and drill bit imaging. In examples, localizing passive sources can be achieved by inverting picked travel times to find an optimal location that minimizes the difference between observed and computed travel times. However, travel time picking can be erroneous for data with a low signal-to-noise ratio (SNR). To enable accurate travel time picking, in an example, waveform-based source location is used to focus passive sources in their accurate subsurface positions. Time-reversal imaging focuses wavefields recorded by receivers at the ignition position given a reasonably accurate velocity model.

Waveform-based interferometric cross-correlation migration (ICCM) can be utilized to focus the passive source in the accurate subsurface position. This can be effective when applied to seismic-while-drilling (SWD) data acquired with continuous and random drill bit source as it drills through the different layers of the subsurface. However, the spatial resolution of the source image using a cross-correlation imaging condition can be relatively low due to the small vertical wavenumbers obtained by imaging with a small number of recording stations placed within a limited aperture. To increase spatial resolution, invoking a multiplicative imaging condition instead of a cross-correlation imaging condition suppresses the migration artifacts and enhances the source image's spatial resolution for microseismic events following hydraulic fracturing. In some embodiments, the present techniques use waveform-based interferometric multiplicative migration to focus a drill bit source in an accurate subsurface position without knowing the excitation time.

The workflow 100 shown in FIG. 1 combines seismic-while-drilling data along and a waveform-based migration that uses a sparsity-promoting imaging condition. The workflow 100 uses a correlated seismic-while-drilling signal with a pilot trace recorded at either top-drive sensors or near the drill bit and windowing around the first-break based on a representative velocity model to assure optimal results.

As shown in FIG. 1, the workflow 100 begins at reference number 102 where correlating passive seismic data with a pilot trace from a top-drive sensor is shown. The pilot trace is a recording from the drill bit vibration that ignites the seismic activity.

In examples, the top-drive sensors include sensors that capture weight on bit and torque information associated with drilling operations. For example, one or more top-drive sensors enables a determination of an actual weight of the drill string.

Figure 2A:
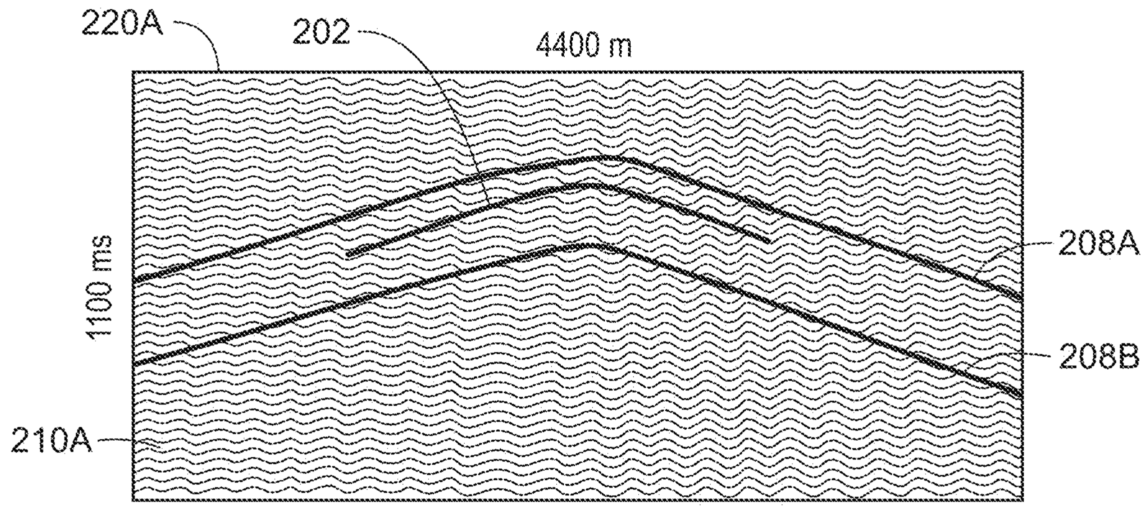
FIG. 2A shows a correlated gather with the drill bit direct arrival to the receivers on the surface.
Figure 2B:
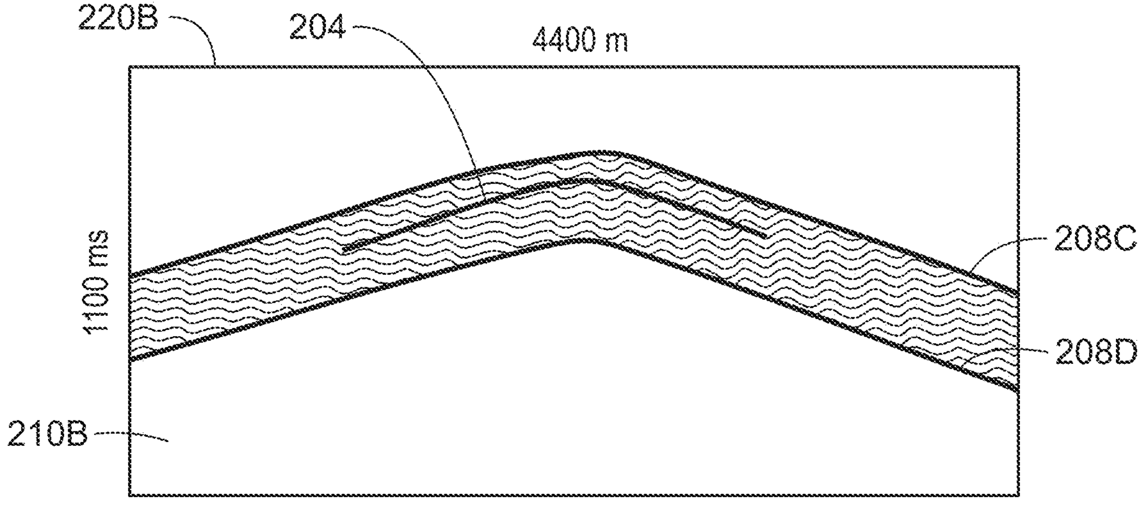
FIG. 2B shows a correlated gather with the drill bit direct arrival to the receivers on the surface.

The workflow 100 starts with the correlated SWD drill bit gathers with the top-drive/downhole sensor that store the drill bit vibrations. The correlated drill bit gathers contain the direct arrival from the downhole source to the surface receivers as shown in FIGS. 2A and 2B. The correlation is performed by measuring the similarity between the pilot signal from the drill-bit inside wellbore and the recorded signal at the surface through a dot product.

The workflow 100 progresses to reference number 104, where improving signal-noise-ratio (SNR) through stacking, linear noise removal and band-pass filtering is shown. The SNR is improved as coherent events add up together through stacking while random noise destructively interferes. In examples, the coherent events are cumulative. Linear noise removal eliminates surface waves. Band-pass filtering extracts the desired frequency content of drill-bit direct and reflection events.

Acquiring seismic-while-drilling (SWD) datasets, in which the drill bit is used as a source while surface receivers are placed on the surface to capture the signal emitted by the travelling drill bit from the surface to the top drive, can be challenging. Acquiring these datasets suffers from extreme low signal-noise-ratio (SNR) that hinders the ability to identify the hyperbolic events from the drill bit and recorded at the surface. Therefore, picking first-breaks on the common-drill bit records can be extremely difficult and deteriorate the drill bit localization result using the kinematic information. The present techniques apply filters and windowing to pick first breaks.

The workflow progresses to reference number 106, where applying a median filter to enhance down-going direct wavefield is shown. In examples, the median filter to eliminates outliers from data.

The workflow progresses to reference number 108, where applying first-break picking around a window is shown.

In an example, a velocity profile that closely resembles (e.g., is substantially the same or similar to) the profile at the newly drilled well from offset wells checkshot or sonic logs is used to isolate the first breaks. In another example, when no velocity information is available, a rough mute function is used to isolate the first breaks as shown in FIG. 2B.

The workflow progresses to reference number 110, where constructing a velocity model through tomography from quality first-break picks is shown. The velocity model is a description of the seismic waves speed in the subsurface rock layers.

The workflow progresses to reference number 112, where migrating direct arrivals to focus a source signal is shown.

In an example, the kinematic behavior of the recorded wavefield on the surface is described by one-way travel paths. The drill bit source can be considered to be a subsurface point scatterer. The migrated image of the drill bit source I(x) can be obtained in the frequency domain by the following summation of the recorded wavefield by surface receivers:

$$I(x) = \sum_A d(A, B)e^{-i\omega(\tau_{xA} - \tau_{xB})}$$

where x is the potential position of the subsurface source. $\tau_{xA}$ and $\tau_{xB}$ are the travel times from the potential drill bit position x to receiver A and B, respectively. d(A,B) is the cross-correlated/deconvolved trace resulting from correlating the trace recorded by receiver A with the one recorded by top-drive receiver B. The recorded data is summed over the surface defined by the one-way traveltime differences between the path from x to A, and the path from x to B as shown in schematically in FIG. 3. The data is summed over all frequencies to invoke the zero-lag imaging condition of the drill bit source.

The workflow progresses to reference number 114, where applying multiplicative imaging condition to promote sparse representation is shown.

The imaging condition of the source is updated from a summation imaging condition to a multiplicative imaging condition that is often used in microseismic events' localization. The same images produced by the redatuming of each receiver down to the source location are multiplied by each other to produce a more focused source image that suppress the Time Reverse Imaging artifacts promoting the sparseness of the drill bit migrated section. The more focused source image of the drill bit source I(x) can be obtained in the frequency domain by the following multiplication that indicates the multiplicative imaging condition:

$$I(x) = \prod_A d(A, B)e^{-i\omega(\tau_{xA} - \tau_{xB})}.$$

FIG. 2A shows a correlated gather showing with a drill bit direct arrival to the receivers on the surface. The raw seismic data with direct arrivals is highlighted. Seismic data has an indirect relationship between time and depth through rock layers velocities. In the examples of FIG. 2A, a first hyperbolic event associated with direct arrivals is highlighted at reference number 202. In examples, the first hyperbolic event carries first break travel times. In the example of FIG. 2A, time is shown along a first axis at reference number 210A and depth is shown alone a second axis at reference number 220A.

The results of the windowing procedure are shown. The input of the windowing as described herein is raw seismic while drilling data, and the output is the event of interest (e.g., the first hyperbolic event). In some examples, the lines 208A and 208B (collectively referred to as lines 208) showing a window are chosen interactively by a human user.

FIG. 2B shows a correlated gather with the drill bit direct arrival to the receivers on the surface. The preserved direct arrivals at reference number 204 are obtained after muting unwanted signals is shown. Time is shown along a first axis at reference number 210B and depth is shown alone a second axis at reference number 220B. In some examples, the lines 208C and 208D (collectively referred to as lines 208) showing a window are chosen interactively by a human user.

Conventionally, the drill bit location is obtained from the recorded waveforms by traveltime-based (kinematic) methods or waveform-based methods such as full-waveform inversion (FWI). The traveltime-based technique uses exhaustive and often inaccurate first-break picking on the noisy seismic-while-drilling (SWD) dataset. The waveform-based inversion such as FWI or migrated of the drill bit events yields a low-resolution subsurface image of the drill bit that has high uncertainty of the true location of the drill bit. By contrast, windowing for first-break picking avoids exhaustive and accurate picking of direct arrivals on noisy drill bit seismic datasets.

Figure 3:
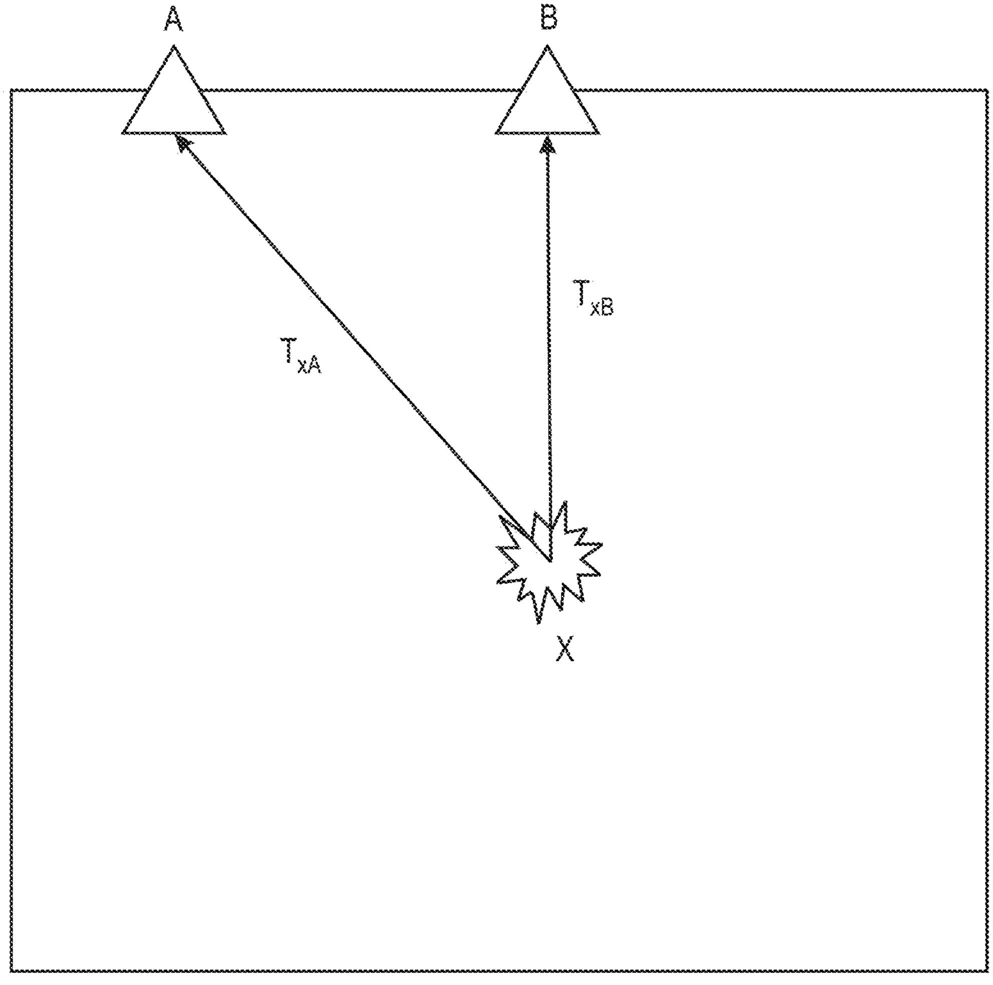
FIG. 3 shows the paths and one-way travel times between the subsurface drill bit position, the surface receivers, and the top-drive receiver.

FIG. 3 shows the paths of one-way travel times between the subsurface drill bit position and the surface receivers and the top-drive receiver.

In the example of FIG. 3, X denotes the subsurface drill bit position. A denotes the surface receivers. B denotes the top-drive receiver. $\tau_{xA}$ and $\tau_{xB}$ are the travel times from the potential drill bit position x to receiver A and B, respectively.

Figure 4:
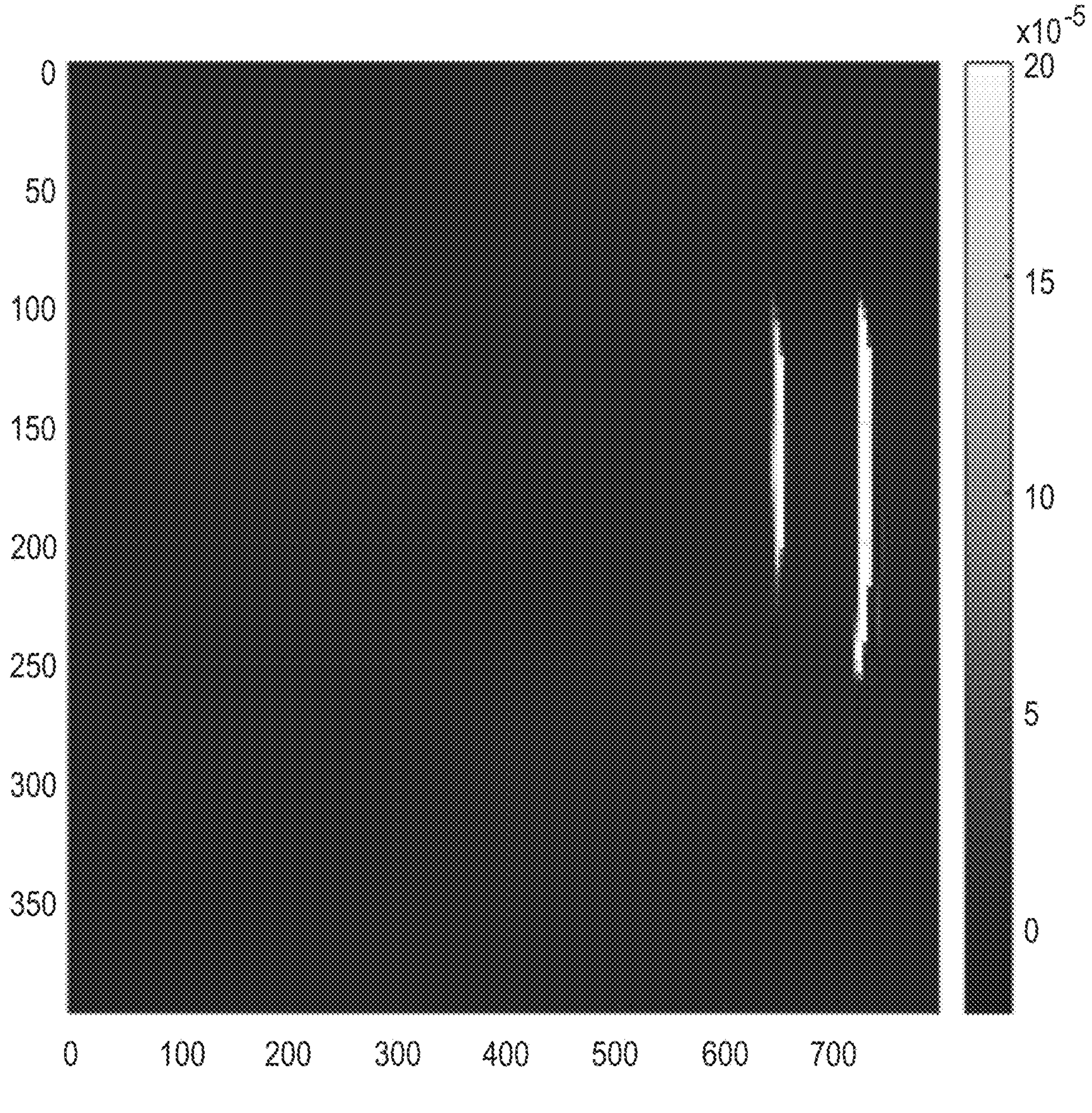
FIG. 4 shows an example of a migrated image with a multiplicative imaging condition.

FIG. 4 shows an example of a migrated image with a multiplicative imaging condition.

This workflow of FIG. 1 was applied on a synthetic model with two fractures imbedded as two white lines. It is shown in FIG. 4 that the implementation of a multiplicative imaging condition can promote a sharp image that delineates the fractures extent.

Figure 5:
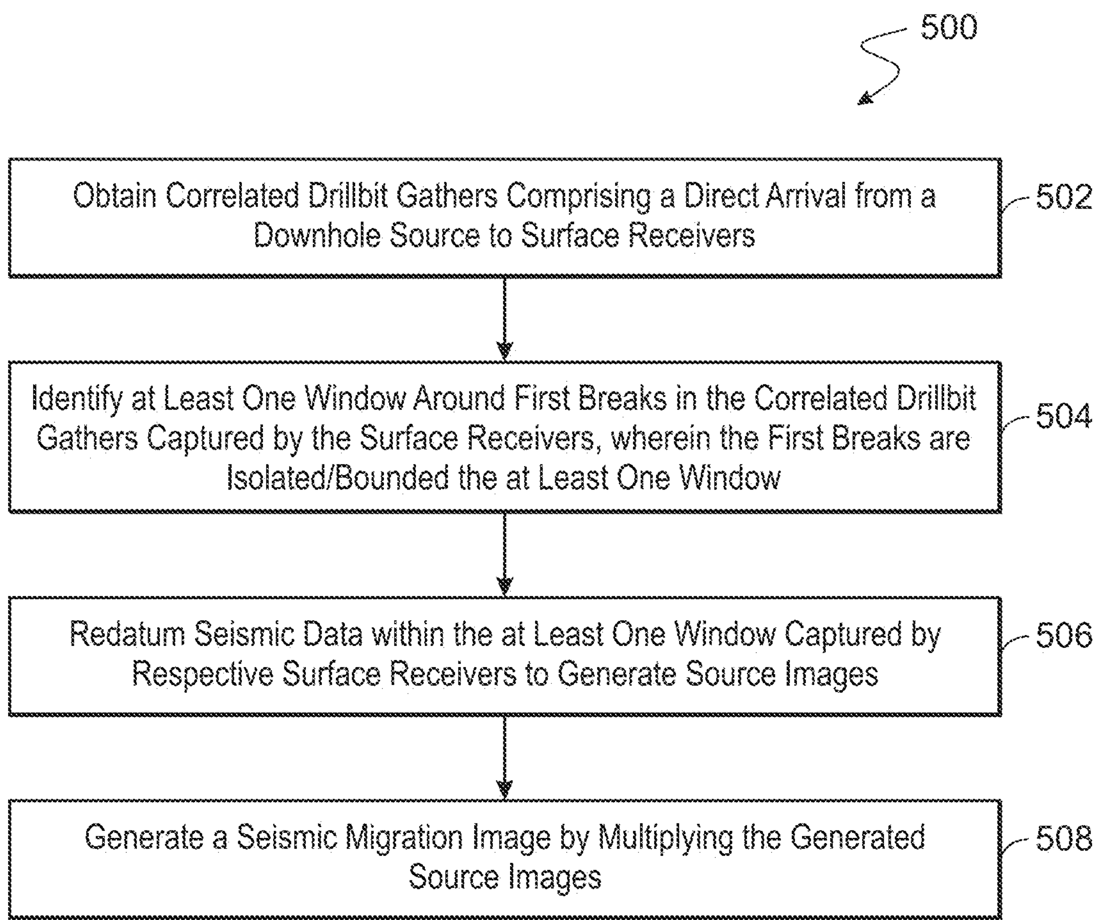
FIG. 5 is a process flow diagram of a process that enables drill bit source focusing.

FIG. 5 is a process flow diagram of a process 500 that enables drill bit source focusing. For convenience, the process 500 will be described as being performed by a system.

At block 502 the system obtains, using at least one hardware processor, correlated drill bit gathers comprising a direct arrival from a downhole source to surface receivers.

The correlated drill bit gathers can be, for example, seismic data that share an acquisition parameter. The acquisition parameter can be a common midpoint gather, which contains traces having a common midpoint.

The direct arrival can be an event or appearance of seismic data as a reflection, refraction, diffraction, or other similar feature, or the time at which seismic data appear. An event in a seismic section can represent a geologic interface. The downhole source can be, for example, a drill bit. The surface receivers can be, for example, geophones.

At block 504 the system identifies, using the at least one hardware processor, at least one window around first breaks in the correlated drill bit gathers captured by the surface receivers, wherein the first breaks are isolated/bounded the at least one window.

The first breaks can be the earliest arrival of energy propagated from the drill bit to a geophone or the first indication of seismic energy on a trace.

In some examples, the window that isolates the first breaks is generated using a velocity profile. In other examples, the window that isolates the first breaks is determined using a rough mute function. The rough mute function is an estimated interval by the processor to eliminate events other than first break arrivals.

At block 506, the system redatums, using the at least one hardware processor, seismic data within the at least one window captured by respective surface receivers to generate source images.

At block 508, the system generates, using the at least one hardware processor, a seismic migration image by multiplying the generated source images.

In some implementations, the system applies stacking, linear noise removal, and band pass filtering to the correlated drill bit gathers to increase a signal to noise ratio of the correlated drill bit gathers. In some implementations, the system applies a median filter to the correlated drill bit gathers to enhance a down-going direct wavefield of the correlated drill bit gathers.

Figure 6:
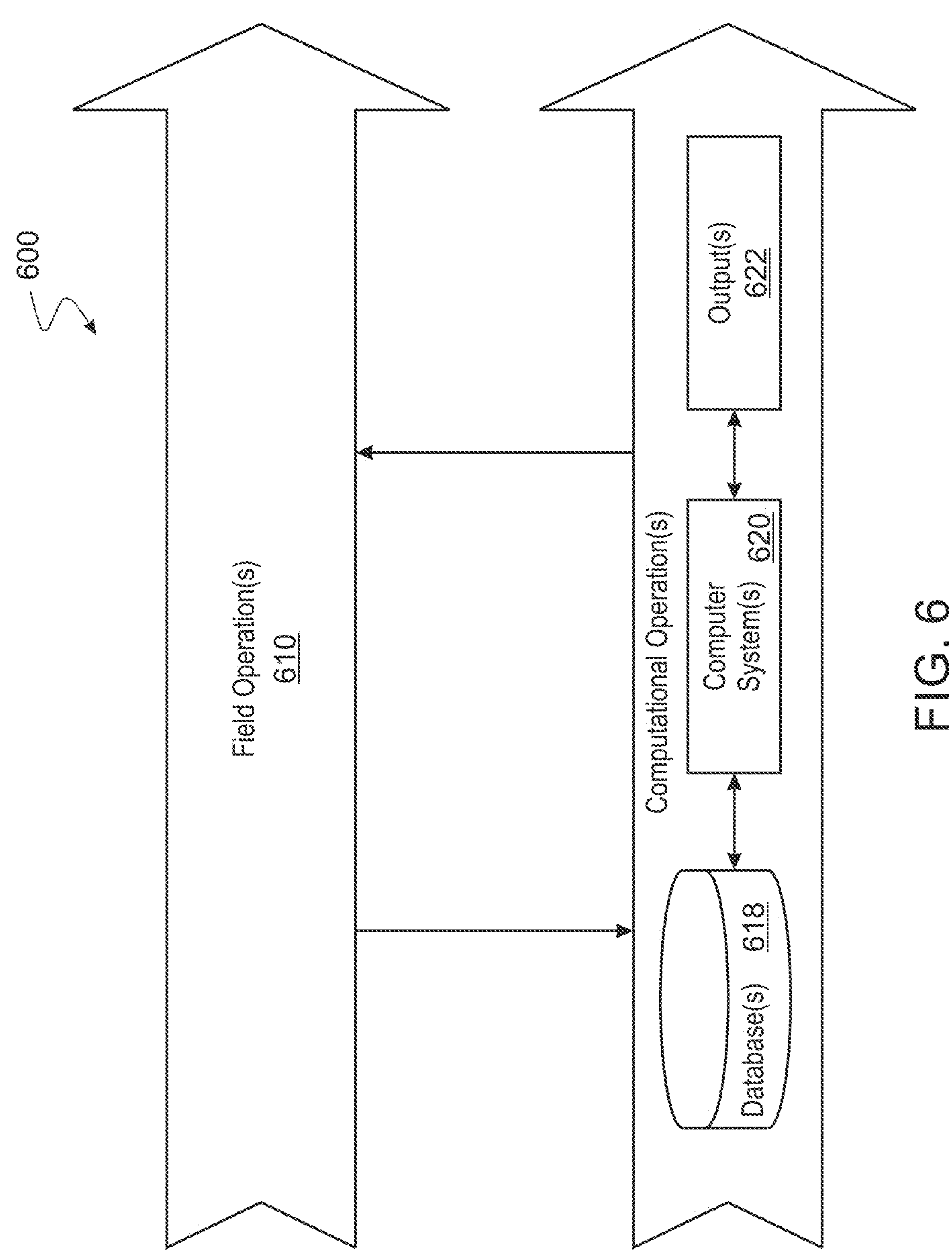
FIG. 6 illustrates hydrocarbon production operations that include both one or more field operations and one or more computational operations, which exchange information and control exploration for the production of hydrocarbons.

Seismic migration is a process by which seismic events are geometrically re-located in either space or time to the location the event occurred in the subsurface rather than the location that it was recorded at the surface, thereby creating a more accurate image of the subsurface FIG. 6 illustrates hydrocarbon production operations 600 that include both one or more field operations 610 and one or more computational operations 612, which exchange information and control exploration for the production of hydrocarbons. In some implementations, outputs of techniques of the present disclosure can be performed before, during, or in combination with the hydrocarbon production operations 600, specifically, for example, either as field operations 610 or computational operations 612, or both.

Examples of field operations 610 include forming/drilling a wellbore, hydraulic fracturing, producing through the wellbore, injecting fluids (such as water) through the wellbore, to name a few. In some implementations, methods of the present disclosure can trigger or control the field operations 610. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 610 and responsively triggering the field operations 610 including, for example, generating plans and signals that provide feedback to and control physical components of the field operations 610. Alternatively or in addition, the field operations 610 can trigger the methods of the present disclosure. For example, implementing physical components (including, for example, hardware, such as sensors) deployed in the field operations 610 can generate plans and signals that can be provided as input or feedback (or both) to the methods of the present disclosure.

Examples of computational operations 612 include one or more computer systems 620 that include one or more processors and computer-readable media (e.g., non-transitory computer-readable media) operatively coupled to the one or more processors to execute computer operations to perform the methods of the present disclosure. The computational operations 612 can be implemented using one or more databases 618, which store data received from the field operations 610 and/or generated internally within the computational operations 612 (e.g., by implementing the methods of the present disclosure) or both. For example, the one or more computer systems 620 process inputs from the field operations 610 to assess conditions in the physical world, the outputs of which are stored in the databases 618. For example, seismic sensors of the field operations 610 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 612 where they are stored in the databases 618 and analyzed by the one or more computer systems 620.

In some implementations, one or more outputs 622 generated by the one or more computer systems 620 can be provided as feedback/input to the field operations 610 (either as direct input or stored in the databases 618). The field operations 610 can use the feedback/input to control physical components used to perform the field operations 610 in the real world.

For example, the computational operations 612 can process the seismic data to generate three-dimensional (3D) maps of the subsurface formation. The computational operations 612 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 612 to process new information about the formation and control the drilling to adjust to the observed conditions in real-time.

The one or more computer systems 620 can update the 3D maps of the subsurface formation as information from one exploration well is received and the computational operations 612 can adjust the location of the next exploration well based on the updated 3D maps. Similarly, the data received from production operations can be used by the computational operations 612 to control components of the production operations. For example, production well and pipeline data can be analyzed to predict slugging in pipelines leading to a refinery and the computational operations 612 can control machine operated valves upstream of the refinery to reduce the likelihood of plant disruptions that run the risk of taking the plant offline.

In some implementations of the computational operations 612, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 7:
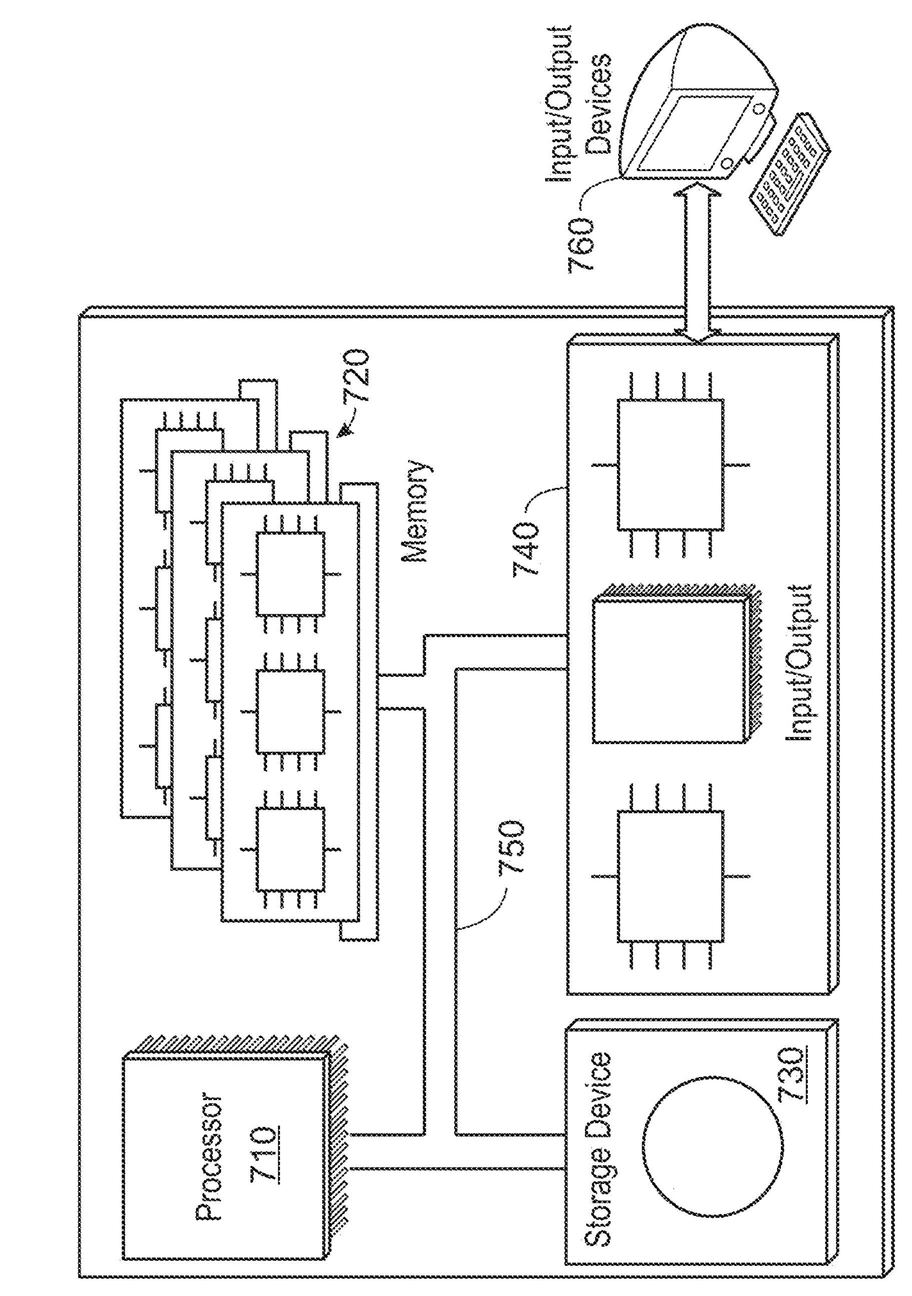
FIG. 7 is a schematic illustration of an example controller (or control system) for that enables drill bit source focusing.

FIG. 7 is a schematic illustration of an example controller 700 (or control system) for that enables drill bit source focusing. For example, the controller 700 may be operable according to the workflow 100 of FIG. 1 or the process 500 of FIG. 5. In some embodiments, the controller 700 is the same as or similar to the computer systems 620 of FIG. 6. The controller 700 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output interface 740 communicatively coupled with input/output devices 760 (for example, displays, keyboards, measurement devices, sensors, valves, pumps). Each of the components 710, 720, 730, and 740 are interconnected using a system bus 750. The processor 710 is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output interface 740.

The memory 720 stores information within the controller 700. In one implementation, the memory 720 is a computer-readable medium. In one implementation, the memory 720 is a volatile memory unit. In another implementation, the memory 720 is a nonvolatile memory unit.

The storage device 730 is capable of providing mass storage for the controller 800. In one implementation, the storage device 730 is a computer-readable medium. In various different implementations, the storage device 730 may be a floppy disk device, a hard disk device, an optical disk device, or a tape device.

The input/output interface 740 provides input/output operations for the controller 800. In one implementation, the input/output devices 760 includes a keyboard and/or pointing device. In another implementation, the input/output devices 760 includes a display unit for displaying graphical user interfaces.

There can be any number of controllers 700 associated with, or external to, a computer system containing controller 800, with each controller 700 communicating over a network. Further, the terms "client," "user," and other appropriate terminology can be used interchangeably, as appropriate, without departing from the scope of the present disclosure. Moreover, the present disclosure contemplates that many users can use one controller 700 and one user can use multiple controllers 700.

Embodiments

According to some non-limiting embodiments or examples, provided is a method, comprising: obtaining, using at least one hardware processor, correlated drill bit gathers comprising a direct arrival from a downhole source to surface receivers; identifying, using the at least one hardware processor, at least one window around first breaks in the correlated drill bit gathers captured by the surface receivers, wherein the first breaks are isolated/bounded the at least one window; redatuming, using the at least one hardware processor, seismic data within the at least one window captured by respective surface receivers to generate source images; and generating, using the at least one hardware processor, a seismic migration image by multiplying the generated source images.

According to some non-limiting embodiments or examples, provided is an apparatus including a non-transitory, computer readable, storage medium that stores instructions that, when executed by at least one processor, cause the at least one processor to perform operations comprising: obtaining correlated drill bit gathers comprising a direct arrival from a downhole source to surface receivers; identifying at least one window around first breaks in the correlated drill bit gathers captured by the surface receivers, wherein the first breaks are isolated/bounded the at least one window; redatuming seismic data within the at least one window captured by respective surface receivers to generate source images; and generating a seismic migration image by multiplying the generated source images.

According to some non-limiting embodiments or examples, provided is system, comprising: one or more memory modules; one or more hardware processors communicably coupled to the one or more memory modules, the one or more hardware processors configured to execute instructions stored on the one or more memory models to perform operations comprising: obtaining, using the at least one hardware processor, correlated drill bit gathers comprising a direct arrival from a downhole source to surface receivers; identifying, using the at least one hardware processor, at least one window around first breaks in the correlated drill bit gathers captured by the surface receivers, wherein the first breaks are isolated/bounded the at least one window; redatuming, using the at least one hardware processor, seismic data within the at least one window captured by respective surface receivers to generate source images; and generating, using the at least one hardware processor, a seismic migration image by multiplying the generated source images.

Further non-limiting aspects or embodiments are set forth in the following numbered embodiments:

Embodiment 1: A computer-implemented method that enables drill bit source focusing, comprising: obtaining, using at least one hardware processor, correlated drill bit gathers comprising a direct arrival from a downhole source to surface receivers; identifying, using the at least one hardware processor, at least one window around first breaks in the correlated drill bit gathers captured by the surface receivers, wherein the first breaks are isolated/bounded the at least one window; redatuming, using the at least one hardware processor, seismic data within the at least one window captured by respective surface receivers to generate source images; and generating, using the at least one hardware processor, a seismic migration image by multiplying the generated source images.

Embodiment 2: The computer implemented method of any preceding embodiments, including applying stacking, linear noise removal, and band pass filtering to the correlated drill bit gathers to increase a signal to noise ratio of the correlated drill bit gathers.

Embodiment 3: The computer implemented method of embodiment 2, including applying a median filter to the correlated drill bit gathers to enhance a down-going direct wavefield of the correlated drill bit gathers.

Embodiment 4: The computer implemented method of any preceding embodiments, wherein the window that isolates the first breaks is generated using a velocity profile.

Embodiment 5: The computer implemented method of any preceding embodiments, wherein the window that isolates the first breaks is determined using a rough mute function.

Embodiment 6: An apparatus comprising a non-transitory, computer readable, storage medium that stores instructions that, when executed by at least one processor, cause the at least one processor to perform operations including: obtaining correlated drill bit gathers comprising a direct arrival from a downhole source to surface receivers; identifying at least one window around first breaks in the correlated drill bit gathers captured by the surface receivers, wherein the first breaks are isolated/bounded the at least one window; redatuming seismic data within the at least one window captured by respective surface receivers to generate source images; and generating a seismic migration image by multiplying the generated source images.

Embodiment 7: The apparatus of any preceding embodiments, the operations including applying stacking, linear noise removal, and band pass filtering to the correlated drill bit gathers to increase a signal to noise ratio of the correlated drill bit gathers.

Embodiment 8: The apparatus of embodiment 7, the operations including applying a median filter to the correlated drill bit gathers to enhance a down-going direct wavefield of the correlated drill bit gathers.

Embodiment 9: The apparatus of any preceding embodiments, wherein the window that isolates the first breaks is generated using a velocity profile.

Embodiment 10: The apparatus of any preceding embodiments, wherein the window that isolates the first breaks is determined using a rough mute function.

Embodiment 11: A system, including: one or more memory modules; one or more hardware processors communicably coupled to the one or more memory modules, the one or more hardware processors configured to execute instructions stored on the one or more memory models to perform operations including: obtaining correlated drill bit gathers comprising a direct arrival from a downhole source to surface receivers; identifying at least one window around first breaks in the correlated drill bit gathers captured by the surface receivers, wherein the first breaks are isolated/bounded the at least one window; redatuming seismic data within the at least one window captured by respective surface receivers to generate source images; and generating a seismic migration image by multiplying the generated source images.

Embodiment 12: The system of any preceding embodiments, the operations including applying stacking, linear noise removal, and band pass filtering to the correlated drill bit gathers to increase a signal to noise ratio of the correlated drill bit gathers.

Embodiment 13: The system of embodiment 12, the operations including applying a median filter to the correlated drill bit gathers to enhance a down-going direct wavefield of the correlated drill bit gathers.

Embodiment 14: The system of any preceding embodiments, wherein the window that isolates the first breaks is generated using a velocity profile.

Embodiment 15: The system of any preceding embodiments, wherein the window that isolates the first breaks is determined using a rough mute function.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad.

User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method that enables drill bit source focusing, comprising:

obtaining, using at least one hardware processor, correlated drill bit gathers comprising a direct arrival from a downhole source to surface receivers;

identifying, using the at least one hardware processor, at least one window around first breaks in the correlated drill bit gathers captured by the surface receivers, wherein the first breaks are isolated/bounded the at least one window;

redatuming, using the at least one hardware processor, seismic data within the at least one window captured by respective surface receivers to generate source images; and generating, using the at least one hardware processor, a seismic migration image by multiplying the generated source images.

2. The computer implemented method of claim 1, comprising applying stacking, linear noise removal, and band pass filtering to the correlated drill bit gathers to increase a signal to noise ratio of the correlated drill bit gathers.

3. The computer implemented method of claim 2, comprising applying a median filter to the correlated drill bit gathers to enhance a down-going direct wavefield of the correlated drill bit gathers.

4. The computer implemented method of claim 1, wherein the window that isolates the first breaks is generated using a velocity profile.

5. The computer implemented method of claim 1, wherein the window that isolates the first breaks is determined using a rough mute function.

6. An apparatus comprising a non-transitory, computer readable, storage medium that stores instructions that, when executed by at least one processor, cause the at least one processor to perform operations comprising:

obtaining correlated drill bit gathers comprising a direct arrival from a downhole source to surface receivers;

identifying at least one window around first breaks in the correlated drill bit gathers captured by the surface receivers, wherein the first breaks are isolated/bounded the at least one window;

redatuming seismic data within the at least one window captured by respective surface receivers to generate source images; and generating a seismic migration image by multiplying the generated source images.

7. The apparatus of claim 6, the operations comprising applying stacking, linear noise removal, and band pass filtering to the correlated drill bit gathers to increase a signal to noise ratio of the correlated drill bit gathers.

8. The apparatus of claim 7, the operations comprising applying a median filter to the correlated drill bit gathers to enhance a down-going direct wavefield of the correlated drill bit gathers.

9. The apparatus of claim 6, wherein the window that isolates the first breaks is generated using a velocity profile.

10. The apparatus of claim 6, wherein the window that isolates the first breaks is determined using a rough mute function.

11. A system, comprising:

one or more memory modules;

one or more hardware processors communicably coupled to the one or more memory modules, the one or more hardware processors configured to execute instructions stored on the one or more memory models to perform operations comprising:

obtaining correlated drill bit gathers comprising a direct arrival from a downhole source to surface receivers;

identifying at least one window around first breaks in the correlated drill bit gathers captured by the surface receivers, wherein the first breaks are isolated/bounded the at least one window;

redatuming seismic data within the at least one window captured by respective surface receivers to generate source images; and generating a seismic migration image by multiplying the generated source images.

12. The system of claim 11, the operations comprising applying stacking, linear noise removal, and band pass filtering to the correlated drill bit gathers to increase a signal to noise ratio of the correlated drill bit gathers.

13. The system of claim 12, the operations comprising applying a median filter to the correlated drill bit gathers to enhance a down-going direct wavefield of the correlated drill bit gathers.

14. The system of claim 11, wherein the window that isolates the first breaks is generated using a velocity profile.

15. The system of claim 11, wherein the window that isolates the first breaks is determined using a rough mute function.

* * * * *